United States Patent [19]

Jones et al.

[11] Patent Number: 5,670,059
[45] Date of Patent: Sep. 23, 1997

[54] METHOD AND COMPOSITIONS FOR TREATING RECIRCULATING WATER SYSTEMS

[75] Inventors: Ronald L. Jones, Suwanee; Stephen L. Carlyle, Stone Mountain; Susan M. Shelor, Alpharetta; Presley K. Mitchell, Marietta; Ellwood LeRoy Lines, Jr., Atlanta, all of Ga.

[73] Assignee: Bio-Lab, Inc., Decatur, Ga.

[21] Appl. No.: 530,639

[22] Filed: Sep. 20, 1995

Related U.S. Application Data

[62] Division of Ser. No. 243,236, May 16, 1994, Pat. No. 5,478,482.

[51] Int. Cl.$^6$ .................................. C02F 1/50; C02F 1/76
[52] U.S. Cl. .......................... 210/753; 210/754; 210/755; 210/756; 210/764; 252/180; 252/181; 424/657; 424/659; 424/660; 424/661; 514/393; 422/37
[58] Field of Search ........................ 210/753, 754, 210/755, 756, 759, 764; 422/37, 28; 424/657, 659, 660, 661, 665; 252/180, 181; 514/393

[56] References Cited

U.S. PATENT DOCUMENTS

| | | | |
|---|---|---|---|
| 4,054,518 | 10/1977 | Gould | 210/199 |
| 4,473,115 | 9/1984 | Oakes | 210/754 |
| 4,594,091 | 6/1986 | Girvan | 71/67 |
| 4,986,902 | 1/1991 | Serna | 210/754 |
| 5,131,938 | 7/1992 | Girvan | 71/67 |
| 5,266,217 | 11/1993 | Roe et al. | 210/764 |
| 5,332,511 | 7/1994 | Gay et al. | 210/755 |
| 5,478,482 | 12/1995 | Jones et al. | 210/753 |
| 5,514,287 | 5/1996 | Jones et al. | 210/753 |

*Primary Examiner*—Neil McCarthy
*Attorney, Agent, or Firm*—Woodard, Emhardt, Naughton, Moriarty & McNett

[57] ABSTRACT

A novel method and compositions are disclosed for the treatment of water in recirculating water systems. The method includes providing a boron level of at least 20 ppm in the water, continually eroding into the water a compressed sanitizer/algicide component including a halogen source material, a boron source material, and glycoluril, and periodically adding to the water an oxidizing clarifier comprising a chlorine source material, a non-halogen, chlorine source material, and a boron source material. The invention also provides novel water treatment chemicals including the compressed sanitizer/algicide component and the clarifier useful in the foregoing system. The system and compositions are safe and reliable, control algal and fungal growth and generally provide improved water quality for recirculating water systems.

23 Claims, No Drawings

METHOD AND COMPOSITIONS FOR TREATING RECIRCULATING WATER SYSTEMS

This application is a division of application Ser. No. 08/243,236, filed May 16, 1994, now U.S. Pat. No. 5,478,482.

FIELD OF THE INVENTION

This invention relates to methods and compositions for the treatment of recirculating water systems such as cooling towers, evaporative condensers, air washers, swimming pools, hot tubs and spas. The invention particularly relates to controlling microbial growth, particularly algae and fungi growth.

BACKGROUND OF THE INVENTION

Swimming pools, hot tubs and spas, as well as other water systems, are subject to contamination from microbes, e.g., algae and fungus, causing unwanted discoloration and turbidity in the water system. Typical organisms that will grow in the water in such systems include Chlorococcum, Chloretla, Cledaphora, Microcystis, Oscilratoris, Spirosyra, Olaothrisx, Vanetteria, and *Aspergilles flavus*. The prevention or inhibition of growth of these microorganisms in water systems has been a problem.

It is customary to treat water systems with one or more sanitizers and/or sanitizer/oxidizer combinations to control the growth of microorganisms. The sanitizers most commonly used to control the growth of microorganisms are chemicals that generate hypochlorite or hypobromite species when dissolved in water. There are many hypochlorite generating chemicals, with the more common ones being chlorine gas, alkali metal hypochlorites such as sodium hypochlorite, alkaline earth metal hypochlorites such as calcium hypochlorite and lithium hypochlorite, halogenated hydantoins and chlorinated isocyanuric acid derivatives such as sodium or potassium dichloro-s-triazinetrione.

Although the foregoing halogen species are excellent water treatment agents, it can be difficult to maintain an efficient level of the halogens to control the growth of the microorganisms. This is especially true for bromine systems and unstabilized chlorine systems. Thus, it is necessary with these systems to continuously replace the lost halogens. With this type of treatment program, there frequently are periods of unnecessarily high halogen levels which are wasteful of the chemicals, and of low to no halogen levels which invite the growth of microorganisms.

Hydrogen peroxide and other inorganic peroxygen compounds, in particular persulfates and persulfuric acids and their salts, are known to be active oxygen containing compounds which are also used for oxidation of water systems. However, hypochlorite compounds and active oxygen compounds generally are not used together to treat water systems. In fact, the manufacturers of both chlorine compounds and peroxygen compounds, as well as other literature sources, have recommended against the blending of these compounds due to their chemical incompatibilities which may lead to explosions or fire.

Also, the Encyclopedia of Chemical Technology (Kirk-Othmer), volume 17, page 1, reports that hydrolysis to $H_2O_2$ followed by the disproportionation of $H_2O_2$ is the main path for decomposition of inorganic peroxide, e.g.,

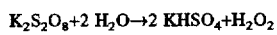

$$K_2S_2O_8 + 2\ H_2O \rightarrow 2\ KHSO_4 + H_2O_2$$

Inorganic peroxides neutralize chlorine in water by acting as dechlorinating agents:

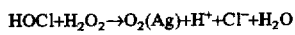

$$HOCl + H_2O_2 \rightarrow O_2(Ag) + H^+ + Cl^- + H_2O$$

Based on the preceding information, it would appear that a combination of these types of compounds would be impractical.

The separate addition of chlorine compounds and a peroxy compound as oxidizing agents is taught in U.S. Pat. No. 3,702,298 issued November 1972 to F. J. Zsoldos et al. This patent teaches the addition of peroxy compounds to swimming pool water containing multivalent metals such as Ag and Cu to raise the valence of the metals to a level at which the metals provide an oxidizing action. Chlorine may also be present as disinfectant in the water system. However, it has not been suggested that chlorine source materials be physically combined with the peroxy compounds in the same dry composition.

In U.S. Pat. No. 4,780,216, issued Oct. 25, 1988 to John A. Wojtowicz, there are disclosed calcium hypochlorite sanitizing compositions consisting essentially of a mixture of calcium hypochlorite and a peroxydisulfate compound. The compositions are indicated to be useful in sanitizing water while helping to minimize the increase in the pH of the water.

In U.S. Pat. No. 4,594,091, issued Jun. 10, 1986 to John W. Girvan, a method of controlling algal and fungal growth using sodium tetraborate or potassium tetraborate in water systems is disclosed. The Girvan patent teaches a method of adding from 10 to 500 ppm boron to water systems. Girvan teaches the separate addition of the boron material, particularly sodium tetraborate, to a water system, which may also include a sanitizer. The results achieved with this approach vary greatly from one swimming pool to the next.

The use of calcium hypochlorite mixed with water-soluble, hydrated inorganic salts to provide a composition which is resistant to exothermic, self-propagating decomposition is disclosed in U.S. Pat. No. 3,793,216, issued to Dychdala et al. on Feb. 19, 1974. The inorganic salts are selected from various hydrated alkali metal and alkaline earth metal phosphates, silicates, borates, carbonates and sulfates.

It has also been known in the prior art to combine boric acid and trichloro-s-triazinetrione. This combination has been described by industry practice for the purpose of increasing solubility and reducing overall raw material costs.

The present invention is surprising in its divergence from teachings of the prior art. For example, the prior art has included indications that boron materials would not be efficacious at the levels utilized herein. See, e.g., Marshall and Hrenoff, Journal of Infectious Diseases, vol. 61, p. 42 (1937).

The prior art systems for the treatment of water for controlling growth of antimicrobials have generally had difficulties with providing consistently dependable results. Theoretical approaches have had shortcomings in practice because of the need for careful attention to water chemistries. The best of systems are inadequate if they are too difficult to be used in practice. The present system and compositions address this problem by providing a simple, reliable and consistent system for the treatment of water systems.

SUMMARY OF THE INVENTION

Briefly describing one aspect of the present invention, there is provided a system for the treatment of water systems to control microbial growth. The system includes the addition of boron to the level of at least about 20 ppm in the water, use of a solid form component to continually add both halogen and boron to the water to help maintain the desired levels of both of these components in the water, and the periodic addition of a clarification treatment which combines a chlorine compound, a non-halogen, oxidizing compound and a boron source material. The system provides an effective, reliable approach to the treatment of water. In addition, the present invention includes an erodible, boron-containing, compressed sanitizer/algicide component and an oxidizing clarifier.

It is an object of the present invention to provide a method and compositions for treating water in recirculating water systems to achieve improved water quality more consistently.

A further object of the present invention is to provide for the treatment of water in swimming pools, hot tubs and spas which allows for quicker swimmer reentry in accordance with current regulatory guidelines.

It is another object of the present invention to provide chemicals useful for water treatment which are safer to transport and use, and which have reduced decomposition and packaging deterioration.

Further objects and advantages of the present invention will be apparent from the following descriptions and examples.

DESCRIPTION OF THE PREFERRED EMBODIMENT

The present invention provides a comprehensive system for the treatment of recirculating water systems utilizing specific compositions which provide improved efficacy and reliability for the control of algae and other microorganisms. The compositions include (1) an initial boron contributor, (2) a solid-form, compressed halogen/boron sanitizer/algicide product, and (3) an oxidizing clarifier comprising a chlorine compound, a non-halogen oxidizer, and a boron source. This system has been shown to consistently provide significantly improved results over prior approaches. These results have been achieved despite teachings in the prior art which have suggested away from the present invention.

The present invention provides a system and compositions for the treatment of a variety of recirculating water systems. For example, the invention is useful for the treatment of cooling towers, evaporative condensers, air washers, swimming pools, hot tubs and spas. The system and compositions are readily adapted for use in these and other environments.

No particular mechanisms of action for the compositions and methods of the present invention are claimed. However, it has been observed that the present invention provides enhanced water quality on a more consistent basis. One explanation for this is a synergistic effect of the boron materials in the water in combination with, for example, adjunct clarifying materials. A second explanation is the operation of the oxidizing clarifier to remove organic impurities, thereby enabling improved control of microorganisms by the primary, halogen-containing compressed sanitizer/algicide component.

The present system includes the use of a boron source material for establishing initial boron levels in the treated water. This is complemented by the subsequent, sustained addition of a combination of halogen-source material and boron-source material. Finally, a third composition, added periodically during the period of treatment, enhances the operation of the overall system.

The novel method utilizes a boron source composition comprising a source of solubilized boron for the water. At the pH of the water systems, e.g., neutral pH in the range 6–8, the boron will be present in the water primarily in the form of triborate [B3O3(OH)4]-1 and tetraborate [B4O5(OH)4]-2 polyions. The boron source composition is added initially to the water system, for example at the beginning of a pool season, to bring the boron level to at least 20 ppm (by weight). The term boron level, as used herein, refers to measurement in terms of elemental boron. The preferred boron level in the treated water ranges from about 20 to about 50 ppm, although higher ranges will work. The most preferred range is 20–26 ppm.

The boron source material may be any suitable compound or mixture. For example, this material may be selected from the group consisting of boric acid, boric oxide (anhydrous boric acid), and compounds having the formula $MnBxOy \cdot ZH2O$, in which M=any alkali earth or metal/non-metallic cation including but not limited to sodium, potassium, calcium, magnesium and ammonium, n=1 to 3, x=any whole number from 2 to 10, y=3x/2+1, and z=0 to 14. The boron compounds include, for example, disodium tetraborate decahydrate, disodium tetraborate pentahydrate, disodium tetraborate tetrahydrate, disodium octaborate tetrahydrate, sodium pentaborate pentahydrate, sodium metaborate tetrahydrate, sodium metaborate bihydrate, dipotassium tetraborate tetrahydrate, potassium pentaborate tetrahydrate, diammonium tetraborate tetrahydrate, and ammonium pentaborate tetrahydrate.

It is generally desirable to maintain a neutral pH in the water systems treated by the present invention. For example, swimming pools are preferably maintained in the range of pH 7–8. At this pH, the boron will appear as polyborate and tetraborate polyions. The addition of certain species of boron, such as tetraborate, will raise the pH of a neutral pH system. For example, the addition of sodium tetraborate sufficient to add 20 ppm of boron to the water, about 1 pound per 1000 gal water, will typically raise a neutral pH to about 9.0–9.5. If a pH-raising boron source material is used, it is then required to add a compatible acid, for example sodium bisulfate or muriatic acid, to adjust the pH back to the desired range.

In the alternative, a pH neutral composition including the boron source material may be used. In particular, boric acid may be used in combination with another boron source, such as the pH-raising borates previously described. A preferred composition is a combination of boric acid and a tetraborate, particularly sodium tetraborate. In this embodiment, the composition preferably comprises 50–100 parts boric acid and 0–50 parts tetraborate, most preferably 90 parts boric acid and 10 parts tetraborate, parts being by weight. Sodium tetraborate (5 mol) is the preferred compound in this regard.

The second component is a solid form material, hereafter referred to as the "compressed sanitizer/algicide component", which includes both a halogen-source composition and a boron-source composition. These materials are blended and formed into a tablet, puck, stick or other solid form that is conveniently eroded into the system water in conventional fashion, such as by use in a skimmer basket or floater. This compressed sanitizer/algicide component continually adds both halogen and boron into the water, which assists in keeping the level of both components at the desired ranges.

The halogen-source component may be selected from any compatible halogen material useful in solid form. The halogen is selected from either chlorine or bromine, and may comprise any solid-form material which provides the halogen in the form of hypohalite ions, i.e. hypochlorite or hypobromite ions, or as hypohalous acid. For example, the halogen-source component may include various chlorine compounds including calcium hypochlorite, lithium hypochlorite, sodium dichloro-s-triazinetrione, potassium dischloro-s-triazinetrione and trichloro-s-triazinetrione. Suitable bromine compounds include brominated hydantoins and brominated glycoluril.

The boron-source composition is included to provide improved characteristics for the tablet and to assist in maintaining the boron level in the water at a desired level. The boron material has been found to enhance the tablet component in several respects. The tablets formulated with the boron source material have reduced off-gassing of chlorine gas. Consequently, the product has less packaging deterioration and reduced levels of noxious chlorine odor. Also, the boron material is preferably present in an amount to provide a significant supplement to the boron in the water.

The boron material may be selected from any of the boron source compositions previously identified. That is, the boron source material is selected from the group consisting of boric acid, boric oxide, and compounds having the formula $M_nB_xO_y \cdot ZH_2O$, in which M, n, x, y and Z are as previously defined.

The respective ranges of the halogen and boron source materials in this second component may therefore vary considerably. The suitable ranges can be readily determined by those in the art based on the water system to be treated, desired erosion rate and/or other physical characteristics of the solid-form component, and other parameters. In one respect, the halogen is preferably present in an amount sufficient to maintain the desired active halogen level in the water, for example 0.5 to 3.0 ppm hypohalite ion in swimming pool water. Also, it has been determined that at least certain boron materials will adversely affect the ability to compound the overall composition into a solid form having desirable erosion characteristics. Therefore, there may be a practical limitation on the amount of boron material which is compounded into the compressed sanitizer/algicide component. In view of these considerations, the compressed sanitizer/algicide component preferably comprises 50.0 to 99.9 parts, more preferably 80.0 to 95.0 parts, of the halogen source material, and 0.1 to 50.0 parts, more preferably 5.0 to 20.0 parts, of the boron source material. As used herein, "parts" refers to parts by weight.

It has also been discovered that the addition of glycoluril will provide advantages both in the compounding of the halogen and boron materials into solid form having a controlled, consistent erosion rate, and in enhancing the release and availability of halogen in the water. This is particularly advantageous since the presence of a boron source material in the tablet will otherwises result in a substantially increased erosion rate. Combination of the boron and halogen source materials otherwise provides a solid material which erodes too quickly for use in conventional systems.

The term glycoluril, unless indicated otherwise, is used to generally to refer to compounds including unsubstituted glycoluril, alkyl-substituted glycoluril, phenyl-substituted glycoluril, chloro-substituted glycoluril and bromo-substituted glycoluril. The compressed sanitizer/algicide component obtains the desired erosion characteristics with a surprisingly low amount of glycoluril. The tablet component may be suitably formulated with not more than 5.0 parts glycoluril. More preferably, the tablet component includes 1 to 3 parts glycoluril. For example, a particularly preferred composition of the tablet component consists of 92.5 parts TCCA, 5 parts sodium tetraborate, and 2.5 parts glycoluril.

The present invention also contemplates the use of an oxidizing clarifier which provides greatly enhanced removal of organic impurities. The clarifier component comprises a unique composition including a chlorine source material, a non-halogen, oxygen donor and a boron source compound. This combination is useful in itself as a clarifier, aside from the system of the present invention. In addition, when used in the overall system described herein, the clarifier provides a supplement for the halogen and boron levels already in the water. When used in the overall system, the oxidation and clarification properties by the clarifier component enhance the control of microorganisms by the compressed santizer/algicide component. This third composition also constitutes a surprisingly safe combination of these materials for use.

For the clarifier component, the chlorine source material is a hypochlorite donor selected from lithium hypochlorite, sodium or potassium dichloro-s-triazinetrione, and trichloro-s-triazinetrione. When used in the foregoing overall system, however, the clarifier component would not include the trichloro-s-triazinetrione.

The non-halogen, oxygen donor is selected from peroxydisulfates and persulfuric acid salts. The peroxydisulfates may include those having the formula: $N_wS_2O_8$ where N is an alkali metal or alkaline earth metal or ammonium, and w is 1 or 2. The alkali metal may include sodium, potassium or lithium. The alkaline earth metal may include calcium or magnesium. The persulfuric acid salts include such compounds as $KHSO_4$, $K_2SO_4$ and $2KHSO_5$. An example of a commercial product of persulfuric acid salts is sold by DuPont under the name OXONE™, which consists essentially of a combination of the compounds $KHSO_4$, $K_2SO_4$ and $2KHSO_5$.

The boron source compound is selected from the group previously defined. Particularly preferred compounds are sodium tetraborate and its derivatives.

For the clarifier component, the constituent materials may be present over a broad range. Selection of appropriate ranges can be accomplished by those in the art based on the teachings herein and consideration of general principles known for the treatment of water. The hypochlorite donor component preferably is present in an amount from 1 to 99 parts, most preferably from 30 to 60 parts, by weight. The non-halogen, oxygen donor component of the composition preferably is present in an amount from 1 to 99 parts, more preferably from 5 to 50 parts, by weight. The boron containing component preferably is present in an amount from 1 to 75 parts, more preferably from 5 to 50 parts, by weight. In a preferred embodiment, the clarifier consists essentially of the three components, in which case the foregoing amounts constitute weight percentages in the overall composition.

The clarifier component may additionally include additives comprising algicides, clarifying agents such as aluminum sulfate, dispersants, flocculants and other chemicals typically used for the treatment of water systems. By way of example, a preferred composition of the clarifier includes 60% sodium dichloro-s-triazinetrione, 20% sodium persulfate, 10% sodium tetraborate, and 10% aluminum sulfate (an additional clarifying agent).

The clarifier component of the present invention may be produced in any suitable dry form. For example, the clarifier could be in the form of granules, pellets, sticks or tablets. The product is preferably compounded in a form to provide relatively rapid dispersion, for example within a few hours. This product is added on a periodic basis, for example weekly, to provide the desired additions of the substituent materials, i.e., hypochlorite, oxidant and boron. For example, for application to swimming pool water the material is typically added at the rate of about 1#/10,000 gallons of pool water. This clarifier product is designed to oxidize organic and inorganic contaminants and to replace boron that is lost through loss of pool water.

In addition to enhancing the removal of microorganisms by the compressed santizer/algicide component, the novel compositions of the present invention are safer to transport and use. That is, the combination of three components yields a safer composition than for certain of the individual components, such as the chlorine source material. For example, sodium dichloro-s-triazinetrione is classified as an oxidizer per DOT regulations. This classification indicates certain levels of safety risks and transportation constraints. By contrast, clarifier products formulated based on this disclosed invention have been found to be non-oxidizers by DOT test, which carry fewer safety risks and transportation limitations.

The following examples are presented to illustrate more fully the present invention:

EXAMPLE 1

The boron level in treated water is raised with various boron containing compounds. Addition of each of the following compounds in appropriate amounts provides a boron level in excess of 20 ppm in the water: boric acid, boric oxide, disodium tetraborate decahydrate, disodium tetraborate pentahydrate, disodium tetraborate tetrahydrate, disodium octaborate tetrahydrate, sodium pentaborate pentahydrate, sodium metaborate tetrahydrate, sodium metaborate bihydrate, dipotassium tetraborate tetrahydrate, potassium pentaborate tetrahydrate, diammonium tetraborate tetrahydrate, and ammonium pentaborate tetrahydrate. Similarly, addition of appropriate amounts of the foregoing compounds provides typically desirable amounts of boron levels in the water, for example, 20, 26, 30 and 50 ppm. As previously indicated, a preferred composition is a combination of boric acid and a pH-raising boron compound, such as a tetraborate. Combination of these two components in amounts of 50, 90 and 100 parts boric acid, and 50, 10 and 0 parts sodium tetraborate, respectively, provide compositions which suitably add boron to the water and permit control of the water pH.

EXAMPLE 2

The compressed sanitizer/algicide is prepared from various combinations of halogen and boron source compounds. The halogen compounds include calcium hypochlorite, lithium hypochlorite, sodium dichloro-s-triazinetrione, potassium dichloro-s-triazinetrione and trichloro-s-triazinetrione, brominated hydantoins and brominated glycoluril. The boron source compounds include those identified in Example 2. The foregoing compounds are formulated into compressed tablets and the like in conventional fashion. The tablets are prepared with various amounts of the components, for example 50 and 99.9 parts halogen compound and 0.1 and 50 parts boron composition, respectively, and upon erosion of the tablets, etc. into water provide increased levels of halogen and boron in the water. In addition, tablets are compounded with up to about 5 parts glycoluril of the various types previously indicated, and including at levels of 2 and 3 parts glycoluril. Such solid-forms of the sanitizer/algicide compositions are readily compounded, erode at suitable rates, and provide desirable amounts of halogen and boron to the water.

EXAMPLE 3

The clarifier compositions are formulated by conventional compounding techniques from the components previously identified. Included are hypochlorite donors selected from lithium hypochlorite, sodium and potassium dichloro-s-triazinetrione, and trichloro-s-triazinetrione. Also provided are the non-halogen oxidizers including peroxydisulfates and persulfuric acid salts previously identified. Finally, the boron compounds are included from the previous list. Mixing of these components in amounts of 1, 30, 60 and 99 parts hypochlorite donor, 1, 5, 50 and 99 parts non-halogen oxidizer, and 1, 5, 50 and 75 parts boron containing compound provides an oxidizer composition which provides improved clarity to the treated water.

EXAMPLE 4

The Department of Transportation (DOT) manages and regulates transportation of hazardous materials. The DOT oversees the classification, description, marking, labeling, packaging, and condition of hazardous materials transported in the United States. The DOT regulations for the transportation of hazardous materials are currently set forth in 49 C.F.R. parts 171–180. Guidelines for the classification, packing group assignment and test methods for oxidizers (Division 5.1 materials) are set forth in Appendix F to Part 173, and provide a test method to measure the potential for a solid substance to increase the burning rate or burning intensity of a combustible substance when the two are thoroughly mixed.

In practice, two tests are run in triplicate for each substance to be evaluated, one at a 1 to 1 ratio, by mass, of the sample to sawdust, and one at a 4 to 1 ratio. For materials classified in Division 5.1, the burning characteristics of each mixture are compared with a standard having a 1 to 1 ratio, by mass, of potassium perchlorate and potassium bromate, as appropriate, to sawdust. For materials classified in Division 4.1, the packing group is determined using the same method; with ammonium persulfate substituted for the potassium compound.

Potassium perchlorate, potassium bromate and ammonium persulfate therefore are reference substances. For use in testing, these substances should pass through a sieve mesh size smaller than 0.3 mm and should not be ground. The reference substances are dried at 65 degrees C. for 12 hours and kept in a desiccator until required. The combustible material for this test is softwood sawdust. It should pass through a sieve mesh sampler smaller than 1.6 mm and should contain less than 5% of water by weight.

A 30.0±0.1 g mixture of the reference substance and sawdust in a 1 to 1 ratio, by mass, is prepared. For comparison, two 30.0±0.1 g mixtures of the material to be tested, in the particle size in which the material is to be transported, and the sawdust, are prepared in ratios of 1 to 1 by mass, and 4 to 1 by mass. Each mixture is mixed mechanically as thoroughly as possible without excessive stress. The test is conducted in a ventilated area under the following ambient conditions: temperature −20 degrees C.±5 degrees C.; humidity—50 percent±10 percent.

Each of the mixtures is formed into a conical pile with dimensions of approximately 70 mm base diameter and 60 mm height on a cool, impervious, low-heat conducting surface. The pile is ignited by means of a wire of inert metal in the form of a circular loop 40 mm in diameter positioned inside the pile 1 mm above the test surface. The wire is heated electrically to 1000 degrees C. until the first sign of combustion is observed, or until it is clear that the pile cannot be ignited. The electrical power used to heat the wire is turned off as soon as there is combustion. The time is recorded from the first observable sign of combustion to the end of all reaction: smoke, flame, incandescence. The test is repeated three times for each of the two mixing ratios.

A substance is classified in Division 5.1 if, in either concentration tested, the mean burning time of the sawdust, established from three tests, is equal to or less than that of the average of the three tests with the ammonium persulfate mixture. Packing Group I is assigned to any substance which, in either mixture ratio tested, exhibits a burning time less than potassium bromate. Packing Group II is assigned to any substance which, in either mixture ratio tested, exhibits a burning time equal to or less than that of potassium perchlorate and the criteria for Packing Group I are not met. Packing Group III is assigned to any substance which, in either mixture ratio tested, exhibits a burn time equal to or less than that of ammonium persulfate and the criteria for Packing Groups I and II are not met.

Samples identified in Table 1 were subjected to oxidizer testing in accordance with the preceding test procedures. When the samples were subjected to the oxidizer testing, it was anticipated that the compositions would at least remain in the Division 5.1 oxidizer category, since that is the classification for sodium dichloro-s-triazinetrione. However, surprisingly, the tests indicated that all three samples were classified as non-oxidizers per DOT standards. These results are contrary to what would be expected, particularly in view of the fact that manufacturers of chlorine oxidizers and oxygen based oxidizers strongly recommend that these materials not be blended together due to incompatibilities.

TABLE 1

|  | SAMPLE # | | |
| --- | --- | --- | --- |
|  | 150A | 147A | 150B |
| Sodium dichloro-s-triazinetrione | 60% | 60% | 60% |
| Sodium persulfate | 20% | 30% | — |
| Sodium tetraborate 5 mol | 10% | 10% | 10% |
| Aluminum sulfate | 10% | — | 10% |
| Oxone | — | — | 20% |

EXAMPLE 5

The three compositions from Example 1 were subjected to additional hazard testing to determine any incompatibilities. The tests performed were DTA, Dust Explosion severity, impact sensitivity and self heating test. The test results are summarized hereafter, in which DPS refers to sodium persulfate; "dichlor" refers to sodium dichloro-s-triazinetrione, ACL-60 refers to sodium dichloro-s-diazinetrione, borate refers to sodium tetraborate, alum refers to aluminum sulfate, glycoluril refers to unsubstituted glycoluril, and all percentages are by weight.

JANAF THERMAL STABILITY

100% sodium dichloro—slight exotherm at 140 degrees C.; sharp, powerful exotherm at 147 degrees C.; (rupture disc) catastrophic decomposition, too quick to determine temp/press; would be classified as flammable for transportation.

IMPACT SENSITIVITY 49.5% sodium dichlor, 49.5% sodium monopersulfate and 1% glycoluril—50% probability of initiation at 18.5 inches.

41% sodium dichlor—50% probability of initiation at 18.5 inches.

DUST EXPLOSION SEVERITY

60% ACL-60, 20% OXONE, 10% borate and 10% alum—no trial produced a positive result.

60% ACL-60, 30% DPS and 10% borate—no trial produced a positive result.

60% ACL-60, 20% DPS, 10% borate and 10% alum—no trial produced a positive result.

IMPACT SENSITIVITY

60% ACL-60, 30% DPS, and 10% borate—each material was subjected to the maximum drop height of 36" with the 2 kgm weight for ten trials per material, using a fresh sample each time. No positive result was obtained in any trial.

60% ACL-60, 20% DPS, and 10% borate—each material was subjected to the maximum drop height of 36" with the 2 kgm weight for ten trials per material, using a fresh sample each time. No positive result was obtained in any trial.

60% ACL-60, 20% OXONE, 10% borate and 10% alum—each material was subjected to the maximum drop height of 36" with the 2 kgm weight for ten trials per material, using a fresh sample each time. No positive result was obtained in any trial.

JANAF THERMAL STABILITY (DTA)

60% ACL-60, 20% DPS, 10% borate and 10% alum—in the initial trial with this material, exothermic behavior was observed at about 111 degrees C. Sample temperature rose over about 90 seconds to about 130 degrees C., held about 30 seconds, then rose to about 140 degrees C. over about 30 seconds, where a sharp, catastrophic reaction caused rupture to the 3000 psig disc. A replicate trial produced essentially identical results.

60% ACL-60, 20% OXONE, 10% borate and 10% alum—in the initial trial with this material, exothermic behavior was observed at about 111 degrees C. Sample temperature rose over about 60 seconds to about 124 degrees C., paused about 60 seconds, then rose to about 140 degrees C. over about 30 seconds, where a sharp, catastrophic reaction caused identical results, except that the transition points were less sharply defined.

JANAF THERMAL STABILITY

60% ACL-60, 30% DPS and 10% borate—in the initial trial with this material, exothermic behavior was observed at about 137 degrees C. About 60 seconds later, at about 152 degrees C., a sharp, catastrophic reaction caused rupture of the 3000 psig disc. A replicate trial produced identical results.

OXIDIZER TESTING

60% ACL-60, 30% DPS and 10% borate—based on the test results, it is recommended that the material represented by this sample does not need to be classified as an oxidizer, as defined by CFR 49, section 173, Appendix F. Note that while the average burn time of the 4 to 1 ratio was shorter than the reference, the material was not completely consumed.

60% ACL-60, 20% DPS, 10% borate and 10% alum—based on the test results, it is recommended that the material represented by this sample does not need to be classified as an oxidizer, as defined by CFR 49, section 173, Appendix F.

Note that the average burn time of the 1 to 1 ratio mixture burned considerably longer than the reference. Also, while the average burn time of the 4 to 1 ratio mixture was shorter than the reference, the material was not completely consumed.

60% ACL-60, 20% OXONE, 10% borate and 10% alum—based on the test results, it is recommended that the material represented by this sample does not need to be classified as an oxidizer, as defined by CFR 49, section 173, Appendix F. Note that the average burn time of the 1 to 1 ratio mixture burned considerably longer than the reference. Also, while the average burn time of the 4 to 1 ratio mixture was shorter than the reference, the material was not completely consumed.

UN CLASS 4.1 PRELIMINARY SCREEN TEST

60% ACL-60, 20% OXONE, 10% borate and 10% alum—the sample was formed into an unbroken strip about 250 mm long by 20 mm wide by 10 mm high on a cool, impervious (steel) base plate. Ignition of the sample was attempted at one end by a gas burner. The sample would not sustain ignition after two minutes exposure to the flame. Based on this result, the UN 4.1 Burn Rate Test is not required.

UN CLASS 4.2 PRELIMINARY SCREEN TEST

60% ACL-60, 20% OXONE, 10% borate, and 10% alum—1155.4 grams of the sample were placed into a 10 cc wire mesh basket and covered with a larger wire mesh basket. The sample was maintained at 140 degrees C. for 24 hours. Starting at ambient temperature, the sample temperature slowly climbed and matched the oven temperature about nine hours after the start. The temperature continued to rise, reaching a maximum temperature of 149 degrees C. about 12 hours after start. The temperature then began to fall, dropping to 146 degrees C., where it remained for the rest of the 24 hour test period. After the test, the sample was allowed to cool, then reweighed and examined. The sample experienced an 89.6 gram weight loss and did not exhibit visible change.

Results/Discussion: The impact sensitivity testing for all three compositions was negative, which indicates that the composition will not explode on impact. The key indicator for compatibility is the results of the DTA testing. The compositions that contained no alum exhibited exotherms at 137 degrees C., which is approximately the same for 100% ACL-60 (140 degrees C.). The composition which contained alum exhibited exotherms around 111 degrees C. Although these exotherms for the alum containing compositions occurred at a lower temperature, these compositions are still considered as safe as calcium hypochlorite which exotherms at 111 degrees C. The overall results of the combined hazard testing indicate that these blends will be stable and safe to transport, store and use.

EXAMPLE 6

Several compositions were tested for storage stability at elevated temperatures. Two-hundred gram samples of the composition were prepared and sealed in one quart plastic bottles. The bottles were fitted with two stopcocks which allow the removal of collected gases. The bottles were then placed into an oven at 50 degrees C. for 72 hours. At the end of 72 hours, the bottles were removed from the oven and collected gas was removed from the head space by blowing dry air into the bottle which forced the collected gas into a gas collecting cylinder which contained a solution of potassium iodide/water/ethanol. The KI solution was titrated with sodium thiosulfate and the mg of chlorine gas was calculated. The results are summarized in Table 2.

TABLE 2

| | TEST SUBSTANCE/RESULTS | | | |
|---|---|---|---|---|
| BOTTLE # | SODIUM DICHLORO-S-TRIAZINETRIONE | OXONE | BORAX | $Mg.Cl_2$ |
| A | 60% | 30% | 10% | 0.71 |
| B | 60% | 40% | — | 1.20 |
| C | 100% | — | — | 1.10 |

The test results indicate that the compositions are stable and do not produce excessive chlorine gas during storage at elevated temperatures.

EXAMPLE 7

In this example the oxidation performance of several oxidizer compounds were evaluated. The oxidation performance was determined by measuring the destruction of crystal violet dye. The following protocol was followed:

This protocol is designed to evaluate several oxidizer compounds and combinations of oxidizer compound as potential shock products to be used in pools and spas.

REAGENTS: Crystal Violet Dye Solution

APPARATUS: pH Meter: equipped with platinum electrode) HACH 3000, Spectrophotometer

PROCEDURE:

1) Prepare the following test solutions:

| TEST CMPD. | gm/L | COLUMN A DILUTION AMOUNT | ppm ACTIVE AT USE DILUTIONS |
|---|---|---|---|
| Lithium hypochlorite | 2.86 | 8 ml/l | 8 ppm $Cl_2$ |
| Oxone | 1.00 | 11 ml/l | 0.5 ppm $O_2$ |
| DPS | 1.00 | 11 ml/l | 0.5 ppm $O_2$ |
| $H_2O_2$ | 3.70 | 30 ml/l | 30 ppm |

2) Into 1500 ml beakers add 1000 mls of distilled water, 1.64 gm of phosphate buffer (pH 7.2–7.6) and 15 drops of crystal violet dye solution. Mix until uniform.

3) Measure initial color number on the HACH 3000 spectrophotometer. Follow HACH method #16. Use distilled water as a blank.

4) Add dilution amount of oxidizer from Column A to the 1 500 ml beaker. Allow to mix 5 mins.

5) Allow beakers to stir for 2 hours. Monitor color number. Calculate percent color reduction. The results are summarized in Table 3.

TABLE 3

| TEST COMPOUND | $Cl_2/O_2$ Ratio (ppm) | Initial Color # | 2 Hour Color # | % Color Reduction |
|---|---|---|---|---|
| LiOCl/Oxone | 8.0/0.5 | 244 | 37 | 85% |
| LiOCl/DPS | 8.0/0.5 | 292 | 26 | 91% |
| LiOCl/$H_2O_2$ | 8.0/30.0 | 296 | 268 | 9.5% |
| LiOCl | 8.0/0 | 288 | 120 | 58% |
| DPS | 0/0.5 | 252 | 252 | 0 |
| Oxone | 0/0.5 | 257 | 162 | 37% |

DPS = Sodium Persulfate

5,670,059

TABLE 3-continued

| TEST COMPOUND | Cl$_2$/O$_2$ Ratio (ppm) | Initial Color # | 2 Hour Color # | % Color Reduction |
|---|---|---|---|---|

LiOCl = Lithium Hypochlorite
Oxone ™ = Potassium Monopersulfate

The results of this experiment indicate that the oxidation performance is greatly enhanced when the chlorine oxidizer and the oxygen oxidizer are combined. In fact, the DPS used alone showed no color reduction but in combination with the chlorine achieved a color reduction of 85%. OXONE alone reduced the color only 37%. Chlorine alone showed a color reduction of 58%. H$_2$O$_2$ another popular oxidizer actually was antagonistic with chlorine. This experiment points out that the DPS or Oxone in the combination with chlorine is not antagonistic, but in fact it appears to enhance the oxidation activity.

EXAMPLE 8

During the summer of 1993, a consumer field test was conducted involving 48 swimming pools. As a control group, 27 pools were operated by the consumer only on a traditional chlorine type program utilizing only a sanitizer tablet in a chlorinator or floater for 18 weeks. The sanitizer tablets contained 92.5% trichloro-s-triazinetrione, 5% sodium tetraborate (5 mol) and 2.5% unsubstituted glycoluril which added a very low level of boron, typically less than 0.1 ppm boron for each pound of tablets added to 10,000 gallons of pool water. The consumers provided their own shock treatment and shocked the water at their discretion. The pools were monitored for algae growth during the test period. During the 18 weeks, 81.5% of the pools experienced algae growth. The results are summarized in Table 4.

At the beginning of week 19, pool numbers 1–13 were given a lithium hypochlorite treatment on a weekly basis at the rate of 1 pound for up to 30,000 gallons of swimming pool water. Also at the beginning of week 19, pools 14–27 were given the clarifier product that contained 60% sodium dichloro-s-triazinetrione, 20% potassium monopersulfate, 10% sodium tetraborate (5 mol) and 10% aluminum sulfate on a weekly basis at the rate of 1# for up to 30,000 gallons of swimming pool water. The testing was continued until week number 36. The number of reported algae incidences were reduced, but still constituted 52% of the pools.dences to 52% of the pools. The results are summarized in Table 5.

TABLE 4

| No | WK 1 | WK 2 | WK 3 | WK 4 | WK 5 | WK 6 | WK 7 | WK 8 | WK 9 | WK 10 | WK 11 | WK 12 | WK 13 | WK 14 | WK 15 | WK 16 | WK 17 | WK 18 |
|---|---|---|---|---|---|---|---|---|---|---|---|---|---|---|---|---|---|---|
| 1 | | | | | | XX | XX | | | | | XX | | | | XX | | |
| 2 | | | | | | | | | | | | | | | | | | |
| 3 | | | | | | | | | | | | | | | | | | |
| 4 | XX | | | | | | | | XX | | | | XX | | | | | |
| 5 | | | | | XX | | | | | | | | | | | | | |
| 6 | XX | XX | | | | | | XX | | | | XX | | | XX | XX | | |
| 7 | | | | | | | XX | XX | | | | | | | | | | XX |
| 8 | XX | | | | XX | | | XX | | | | | | | | | | |
| 9 | XX | XX | | | | | | | | | | | | | | XX | | |
| 10 | | XX | | XX | XX | | XX | XX | | | XX | | | XX | XX | | | |
| 11 | XX | | XX | | | | | | | | XX | XX | | | XX | XX | | |
| 12 | | | | | | | | | | | | | | | | | | |
| 13 | XX | XX | | | | | | | XX | | | | | XX | | XX | | |
| 14 | | | | | | | | | | | | | | | | | | |
| 15 | | | | | | | XX | | | | | | | | | | | |
| 16 | | | | | XX | | | | | | | | | | | | | |
| 17 | | | | | | | XX | | | | | | | | | | | |
| 18 | | | | | XX | XX | XX | | | | | | | | | | | |
| 19 | | | | | | | | | | | | | | | | XX | XX | XX |
| 20 | | | | XX | | XX | XX | | XX | | | | | | | | | |
| 21 | XX | XX | XX | XX | XX | XX | XX | XX | | XX | | | | | | | | |
| 22 | | | | | | | | | | | | | | | | | | |
| 23 | | | | | | | | XX | | | | | | | | | | |
| 24 | | | | | | XX | | XX | XX | XX | XX | | | XX | XX | XX | XX | XX |
| 25 | | | | | | | | | | | XX | XX | | XX | XX | | | |
| 26 | | | XX | XX | XX | | | XX | XX | XX | XX | XX | | | | | | |
| 27 | XX | XX | XX | XX | | XX | XX | XX | XX | XX | XX | XX | XX | XX | | | | |

The XX denotes algae growth.

TABLE 5

| No | WK 19 | WK 20 | WK 21 | WK 22 | WK 23 | WK 24 | WK 25 | WK 26 | WK 27 | WK 28 | WK 29 | WK 30 | WK 31 | WK 32 | WK 33 | WK 34 | WK 35 | WK 36 |
|---|---|---|---|---|---|---|---|---|---|---|---|---|---|---|---|---|---|---|
| 1 | | | | | | | | | | | | | | | | | | |
| 2 | | | | | | | | | | | | | | | | | | |
| 3 | | | | | | | | | | | | | | | | | | |
| 4 | | | | | XX | | XX | | | | | | | | | | | |
| 5 | | | | | | | | | | | | | | | | | | |
| 6 | | | | | | | | | | | | | | | | | | |
| 7 | | | | | | | | | | | | XX | | | | | | |
| 8 | | | | | | | | | | | | XX | | | | | | |
| 9 | | | | | | | | | | | | | | | | | | |
| 10 | XX | | | | | | | | | | | | | | | | | |
| 11 | | | XX | | | | | XX | | | | | | | | | | |
| 12 | | | | | | | | | | | | | | | | | | |
| 13 | | | | | | | | | | | | | | | | | | |
| 14 | | | | | | | | | | | | | | | | | | |
| 15 | | | | | | | | | | | | | | | | | | |
| 16 | XX | | | | | | | | | | | | | | | | | |
| 17 | | | | | | | | | | | | | | | | | | |
| 18 | | | | XX | | | | | | | | | | | | | | |
| 19 | | | | | | | | XX | | XX | | | | | | | | |
| 20 | | | | | | XX | | XX | | | | | | | | | | |
| 21 | | | | | | | | | | | | | | | | | | |
| 22 | | | XX | | | | | | | | | | | | | | | |
| 23 | | | XX | | | | | | | | | | | | | | | |
| 24 | | | XX | XX | XX | XX | | | | | | | | | | | | |
| 25 | | | | | | | | | | | | | | | | | | |
| 26 | | | | | | | | | | | | | XX | XX | | | | |
| 27 | XX | | | | | | | | | | | | | | | | | |

The XX denotes algae growth.

By comparison, 16 pools were initially operated on a commercially available boron system with boron levels maintained at less than 20 ppm. The same chlorine sanitizer tablet used in the previous pools was also used to treat these pools. The chlorine tablets were added to the pool through a chlorinator or a floater. The consumers added their own shock treatment at their discretion. During the 18 week test period, 62% of these pools experienced algae growth. The test results are summarized in Table 6.

taining 92.5% trichloro-s-triazinetrione, 5% sodium tetraborate 5 mol and 2.5% unsubstituted glycoluril were used to provide both chlorine and boron on a continuous basis. The pools were treated with blended clarifier component on a weekly basis at the rate of 1 pound for up to 30,000 gallons of pool water. During the 19 weeks, only three pools (19.0%) reported algae growth. One pool reported algae growth during week #23 due to mechanical problems resulting in an interruption of the chlorine feed system and

TABLE 6

| No | WK 1 | WK 2 | WK 3 | WK 4 | WK 5 | WK 6 | WK 7 | WK 8 | WK 9 | WK 10 | WK 11 | WK 12 | WK 13 | WK 14 | WK 15 | WK 16 | WK 17 | WK 18 |
|---|---|---|---|---|---|---|---|---|---|---|---|---|---|---|---|---|---|---|
| TM | 79 | 81 | 81 | 82 | 84 | 85 | 86 | 86 | 87 | 86 | 87 | 87 | 87 | 87 | 87 | 86 | 86 | 85 |
| 25 | XX | | | | | | | | | | | | | | | | | |
| 26 | XX | XX | XX | XX | XX | XX | | | | | | | | | | | | |
| 27 | | | | | | | | | | | | | | | | | | |
| 28 | | | | | | | | | | | | | | XX | | | | |
| 29 | XX | XX | XX | XX | XX | XX | XX | XX | XX | | | | | | | XX | XX | |
| 30 | | XX | XX | | | | | | | XX | | | | | | | | |
| 31 | | | | | | | | | | | | | | | | | | |
| 32 | | | | | | | | | | | | | | | | | | |
| 33 | | | | | | | | | | | | | | | | | | |
| 34 | | | | | | | | | | XX | | | | | | | | |
| 35 | | | | | | | | | | | | | | | | | | |
| 36 | | | | | | | | | | | | | | | | XX | | |
| 37 | XX | | | | | | | | | | | | | | | | | |
| 38 | XX | | XX | | XX | | | | | | | | | XX | | XX | XX | |
| 39 | | | | | | | | | | | | | | | | | | |
| 40 | | | | | XX | | | | | | | | | | | XX | XX | XX |

The XX denotes algae growth.

At the beginning of weeks 17–19, these 16 pools were converted to the method of the present invention. The boron levels were increased to 26–30 ppm. Sanitizer tablets containing subsequent chlorine readings of 0 ppm. The test results are summarized in Table 7.

TABLE 7

| No | WK 19 | WK 20 | WK 21 | WK 22 | WK 23 | WK 24 | WK 25 | WK 26 | WK 27 | WK 28 | WK 29 | WK 30 | WK 31 | WK 32 | WK 33 | WK 34 | WK 35 | WK 36 |
|---|---|---|---|---|---|---|---|---|---|---|---|---|---|---|---|---|---|---|
| TM | 79 | 81 | 81 | 82 | 84 | 85 | 86 | 86 | 87 | 86 | 87 | 87 | 87 | 87 | 87 | 86 | 86 | 85 |
| 25 | | | | | | | | | | | | | | | | | | |
| 26 | | | | | | | | | | | | | | | | | | |
| 27 | | | | | | | | | | | | | | | | | | |
| 28 | | | | | | | | | | | | | | | | | | |
| 29 | | | | | | | | | | | | | | | | | | |
| 30 | | | | | | | | | | | | | | | | | | |
| 31 | XX | | | | | | | | | | | | | | | | | |
| 32 | | | | | | XX | | | | | | | | | | | | |
| 33 | | | | | | | | | | | | | | | | | | |
| 34 | | | | | | | | | | | | | | | | | | |
| 35 | | | | | | | | | | | | | | | | | | |
| 36 | | | | | | | | | | | | | | | | | | |
| 37 | | | | | | | | | | | | | | | | | | |
| 38 | | | | | | | | | | | | | | | | | | |
| 39 | | | | | | | | | | | | | | | | | | |
| 40 | XX | | | | | | | | | | | | | | | | | |

The XX denotes algae growth.

The results of the 36 week field test clearly indicate that the method of the present invention reduces the growth of algae.

EXAMPLE 9

The treatment of various recirculating systems is repeated in accordance with the present invention and the process of Example 8 using the various products referenced in Examples 1–3 and suitable results along the lines of Example 8 are achieved.

EXAMPLE 10

The loss of the boron component in a water system was demonstrated in a 22,000 gallon swimming pool located in North Atlanta, Georgia. Sodium tetraborate was added to the pool to achieve a concentration of 26 ppm of boron in the pool. The pool continued to operate on a chlorine sanitizer with weekly shock treatments. Seven months later, the pool water was rechecked. The boron level had dropped to 20 ppm, pointing out that the boron is depleted with time and must be continually replenished.

What is claimed is:

1. A clarifier composition for use in the clarification of recirculating water which comprises a combination of a chlorine source material for providing hypochlorite ions to the water, a non-halogen, oxygen donor material, and a boron source material, the chlorine source material being selected from the group consisting of lithium hypochlorite, sodium or potassium dichloro-s-triazinetrione and trichloro-s-triazinetrione.

2. The composition of claim 1 in which the non-halogen, oxygen donor material is selected from the group consisting of peroxydisulfates and persulfuric acid salts.

3. The composition of claim 1 in which the boron source material is selected from the group consisting of boric acid, boric oxide, and compounds having the formula $M_nB_xO_y \cdot ZH_2O$, in which M=sodium, potassium, calcium, magnesium or ammonium, n=1 to 3, x=any whole number from 2 to 10, y=3x/2+1, and z=0 to 14.

4. The composition of claim 1 which comprises 1 to 99 parts chlorine source material, 1 to 99 parts non-halogen, oxygen donor material, and 1 to 75 parts boron source material.

5. The composition of claim 4 which comprises 30 to 60 parts chlorine source material, 5 to 50 parts non-halogen, oxygen donor material, and 5 to 50 parts boron source material.

6. A clarifier composition for use in the clarification of recirculating water which consists essentially of chlorine source material for providing hypochlorite ions to the water, a non-halogen, oxygen donor material, and a boron source material.

7. A method for clarifying recirculating water which comprises adding to the water a clarifier composition comprising a combination of a chlorine source material for providing hypochlorite ions to the water, a non-halogen, oxygen donor material, and a boron source material, said chlorine source material being selected from the group consisting of lithium hypochlorite, sodium or potassium dichloro-s-triazinetrione and trichloro-s-triazinetrione.

8. The method of claim 7 which comprises adding to the water an amount of the clarifier composition to provide from about 1 to about 3 ppm hypochlorite ion in the water.

9. A method for clarifying recirculating water which comprises adding to the water a clarifier composition comprising a combination of a chlorine source material for providing hypochlorite ions to the water, a non-halogen, oxygen donor material, and a boron source material, the clarifier composition comprising a chlorine source material selected from the group consisting of lithium hypochlorite, sodium or potassium dichloro-s-triazinetrione and trichloro-s-triazinetrione, the non-halogen, oxygen source material being selected from the group consisting of peroxydisulfates and persulfuric acid salts, and the boron source material being selected from the group consisting of boric acid, boric oxide, and compounds having the formula $M_nB_xO_y \cdot ZH_2O$, in which M=sodium, potassium, calcium, magnesium or ammonium, n=1 to 3, x=any whole number from 2 to 10, y=3x/2+1, and z=0 to 14.

10. The method of claim 9 in which the clarifier composition comprises 1 to 99 parts chlorine source material, 1 to 99 parts non-halogen, oxygen donor material, and 1 to 75 parts boron source material.

11. The method of claim 10 in which the clarifier composition comprises 30 to 60 parts chlorine source material, 5 to 50 parts non-halogen, oxygen donor material, and 5 to 50 parts boron source material.

12. The method of claim 11 in which the clarifier composition consists essentially of chlorine source material, non-halogen, oxygen donor material, and boron source material.

13. The clarifier composition of claim 1 which is in the form of granules, pellets, sticks or tablets.

14. The composition of claim 1 in which the non-halogen, oxygen source material is selected from the group consisting of peroxydisulfates and persulfuric acid salts.

15. The composition of claim 1 in which the boron source material is selected from the group consisting of boric acid, boric oxide, and compounds having the formula $M_nB_xO_y \cdot ZH_2$, in which M=sodium, potassium, calcium, magnesium or ammonium, n=1 to 3, x=any whole number from 2 to 10, y=3x/2+1, and z=0 to 14.

16. The composition of claim 1 which comprises 1 to 99 parts chlorine source material, 1 to 99 parts non-halogen, oxygen donor material, and 1 to 75 parts boron source material.

17. The composition of claim 16 which comprises 30 to 60 parts chlorine source material, 5 to 50 parts non-halogen, oxygen donor material, and 5 to 50 parts boron source material.

18. The composition of claim 6 which comprises 1 to 99 parts chlorine source material, 1 to 99 parts non-halogen, oxygen donor material, and 1 to 75 parts boron source material.

19. The composition of claim 18 which comprises 30 to 60 parts chlorine source material, 5 to 50 parts non-halogen, oxygen donor material, and 5 to 50 parts boron source material.

20. The method of claim 7 in which the clarifier composition is in the form of granules, pellets, sticks or tablets.

21. The method of claim 7 in which the clarifier composition comprises 1 to 99 parts chlorine source material, 1 to 99 parts non-halogen, oxygen donor material, and 1 to 75 parts boron source material.

22. The method of claim 21 in which the clarifier composition comprises 30 to 60 parts chlorine source material, 5 to 50 parts non-halogen, oxygen donor material, and 5 to 50 parts boron source material.

23. The method of claim 22 in which the clarifier composition consists essentially of chlorine source material, non-halogen, oxygen donor material, and boron source material.

* * * * *